Dec. 13, 1960  R. E. PEIERLS ET AL  2,964,124
SEPARATION OF GASES BY DIFFUSION
Filed Dec. 17, 1943  3 Sheets-Sheet 1

Inventors
R. E. Peierls
F. E. Simon
By H. S. Arms
Wm Webster Downing
Attorney

Dec. 13, 1960  R. E. PEIERLS ET AL  2,964,124
SEPARATION OF GASES BY DIFFUSION
Filed Dec. 17, 1943  3 Sheets-Sheet 2

Inventors
R.E.Peierls
By F.E.Simon
H.S.Arms
Attorney

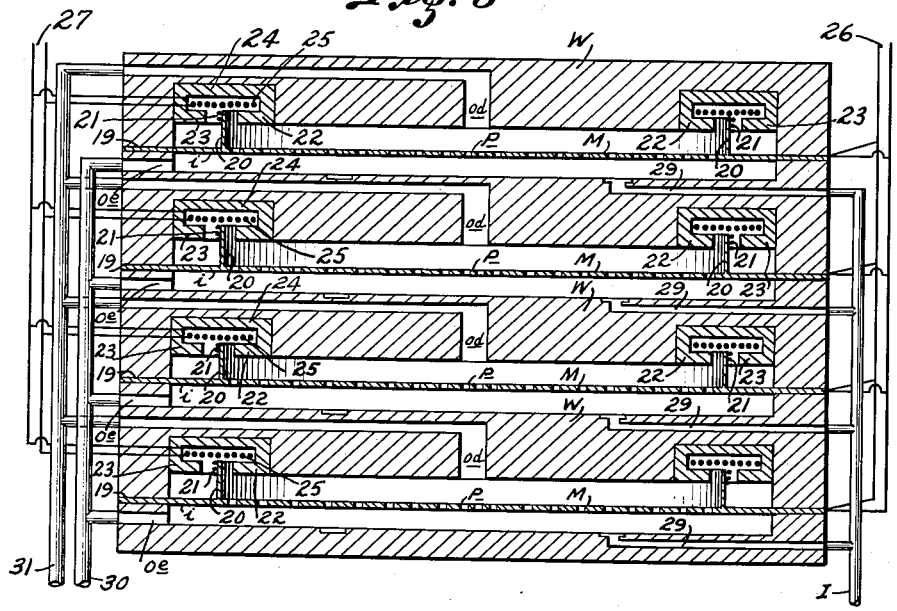
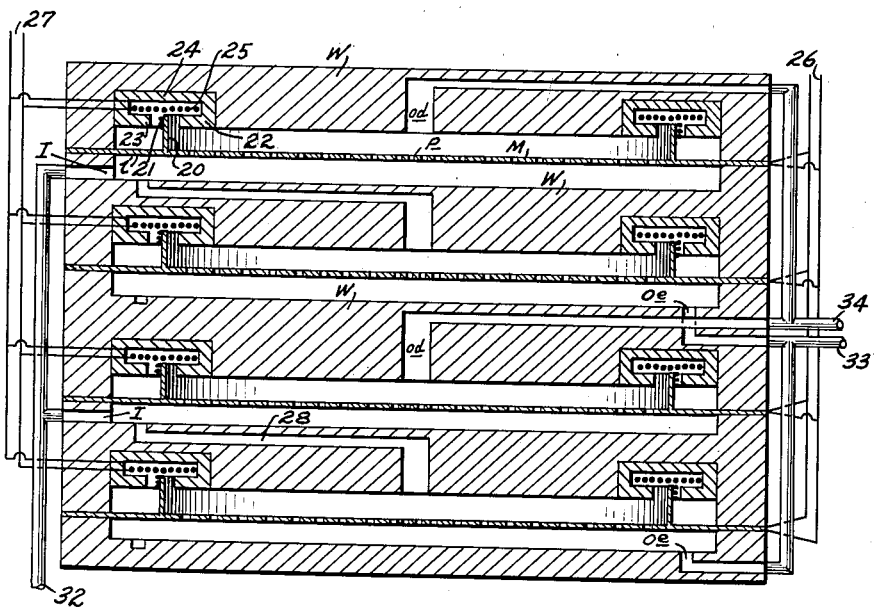

United States Patent Office 2,964,124
Patented Dec. 13, 1960

2,964,124

SEPARATION OF GASES BY DIFFUSION

Rudolf Ernst Peierls, Birmingham, and Franz Eugen Simon and Henry Shull Arms, Oxford, England, assignors, by mesne assignments, to the United States of America as represented by the United States Atomic Energy Commission Filed Dec. 17, 1943, Ser. No. 514,720

Claims priority, application Great Britain Jan. 20, 1943

17 Claims. (Cl. 183—2)

This invention relates to the separation of mixtures of gaseous or vaporous media by diffusion through a permeable membrane, and a principal object is to obtain in effect a multiplicity of stages without any physical separation of the stages. This makes it possible to obtain large concentration changes in a given volume of mixture of media without the necessity of employing a relatively large separating apparatus.

Our invention resides in a method of separation in which two sheets of the mixture separated by a permeable membrane and bounded by walls spaced from the membrane, are subjected to pressure variations such as to produce a pressure difference acting on the membrane in opposite directions alternately, and simultaneously to a periodic motion of the mixture under treatment parallel to the membrane in opposite directions on the two sides thereof and of the same frequency as the alternating pressure difference; by these means, as will be explained below, a unidirectional concentration gradient along the sheet is set up in the direction of the periodic motion.

The alternating pressure change on opposite sides of the membrane may be produced by a relative reciprocating motion between the membrane and one or both walls facing it, in a direction normal or substantially normal to the membrane. As explained below the sheets of media must be relatively thin, but within the limits so imposed it is desirable to make the amplitude of the reciprocation as large as mechanical conditions permit, to produce the maximum pressure changes.

In a first form of the invention, the relative reciprocation is between the membrane on the one hand and the walls on the other hand. In a second form, the reciprocating motion is between one wall on the one hand and the membrane and the other wall on the other hand.

The periodic motion of the mixture parallel to the membrane may be imparted to it by reciprocating the walls themselves, or it may be produced automatically as a result of the alternating pressure change by the provision of boundary zones which are respectively less permeable and more permeable than the main part of the membrane, these zones being provided at opposite ends of the membrane towards and from which the motion parallel to the membrane takes place. The same effect can be obtained by the provision of one of the boundary zones at the periphery and the other at the centre of the membrane, such zones still being in effect at the "ends" of the "length" of membrane along which the motion parallel to the membrane takes place, and the term "end" used in this specification and in the claims is to be interpreted accordingly where the context permits. The simplest form of membrane having such peripheral and central boundary zones is circular, but other forms such as polygonal can be employed having such zones.

The invention will be further described with reference to the accompanying drawings in which Figure 1 is a diagram illustrating the underlying principles of the invention, with the parts in mean position.

Figure 8 is a similar view to Fig. 7 of a multi-membrane structure, in which all the working spaces are in parallel.

Fig. 9 is a similar view to Fig. 7 of a multi-membrane structure, in which the working spaces are in groups, the spaces within a group being in series, and the groups being in parallel.

In all the figures M indicates the membrane, I the original inlet for the mixture of media, O$e$ the outlet for one fraction and O$d$ the outlet for the other fraction.

Figure 1:
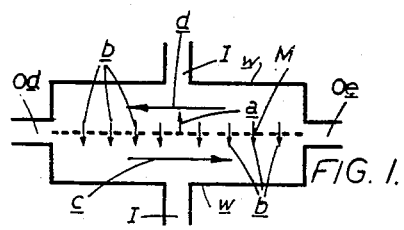
Figure 2:
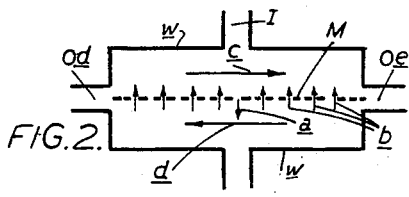
Figure 2 is a similar diagram to Fig. 1 with parts again in the mean position, but at a different point in the cycle of operations.

Considering now the first form of the invention as above stated, and referring to Figures 1 and 2 it will be assumed, solely for convenience in description, that the walls $w$ and membrane M are plane and horizontal, that the membrane is reciprocated vertically while the walls remain stationary at least in the vertical direction, and that during the up-stroke the media above the membrane are moved by suitable means towards the left and media below towards the right, i.e. in directions from a boundary zone at one end of the membrane to a boundary zone at the other end of the membrane, these directions being reversed on the down stroke of the membrane. It will be shown hereinafter that regions of these boundary zones are the places at which the maximum concentrations of the respective media occur. Starting now from the mean position of the membrane M on its up stroke, Figure 1, as it moves upwards, arrow $a$, the pressure above is increased and that below decreased so that the media diffuse downwardly through it, arrow $b$, the molecules of one component of the mixture, in general the lighter molecules, diffusing through more rapidly so that the fraction below becomes enriched in these molecules and the fraction above depleted of these molecules. At the same time the enriched fraction is moved to the right, arrow $c$, and the depleted fraction to the left, arrow $d$. On the down stroke, Figure 2, arrow $a$, the fraction above the membrane becomes enriched and the fraction below depleted, but the motions parallel to the membrane have also been reversed, so that once again the enriched fraction is moved to the right, arrow $o$, and the depleted fraction to the left, arrow $d$. This concentrating action continues until the remixing, caused by diffusion and transport in the opposite direction, reaches equilibrium with the concentrating action. The effect is a unidirectional concentration gradient of the media from one end of the membrane to the other. Accordingly the outlet O$e$ for the enriched fraction will be placed at the right hand end i.e. in the neighborhood of one boundary zone, and the outlet $Od$ for the depleted fraction at the left hand end i.e. in the neighborhood of the other boundary zone. The inlet I for the mixture will be provided at an appropriate point or points intermediate of the boundary zones as determined by the concentration gradient, for instance as shown at the centre and may be provided at the top, or at the bottom, or as shown in Figures 1 and 2 at both the top and bottom. It can be shown that the net concentration effect over the whole length of the membrane is equivalent to a number of stages in series in each of which diffusion through the membrane is effected solely by a pressure difference equal to the mean pressure difference produced by the vertical reciprocation of the membrane, in effect each "stage" consisting of length of the membrane approximately equal to the mean distance of each wall from the membrane, i.e. the number of stages is approximately equal to the length of the membrane divided by the mean distance of each wall from the membrane.

In order to maintain a substantially constant composition across any vertical section of each sheet by diffusion within the sheet, the spacing of the walls from the membrane must be small i.e. they define, on each side of the membrane a shallow compartment. This enables the motion of the media parallel to the membrane to be imparted to them with reasonable efficiency by reciprocating the walls themselves in a direction parallel or substantially parallel to the membrane. The media directly adjacent each wall will be similarly reciprocated and with a spacing of the order here in question, the flow over the whole distance to the membrane will be laminar so that the velocity will vary linearly from a maximum at the wall to zero at the membrane. A sufficient motion for the purpose in view can be obtained in this way. Moreover a phase relation of the motion of the walls parallel to the membrane to the vertical motion of the membrane can be selected which will give the highest efficiency.

Figure 3:
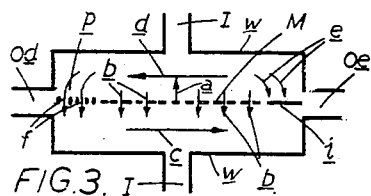
Figure 3 is a diagram illustrating a modified arrangement as compared with Fig. 1, with the parts in the mean position.
Figure 4:
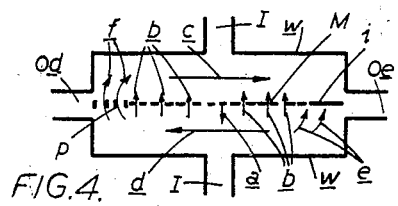
Figure 4 is a similar diagram to Fig. 3, but at a different point in the cycle of operations.

Another method of obtaining the necessary motion of the media parallel to the membrane, which avoids the mechanical problems of moving the walls themselves in this direction and sealing them during such motion, and is therefore preferred, is illustrated in Figures 3 and 4. This consists in providing at the boundary zone at one end of the membrane a zone $i$ which presents more resistance to flow therethrough than the main portion of the membrane i.e. a less permeable, in the limit impermeable, zone and at the boundary zone at the other end of the membrane a zone $p$ which presents less resistance to flow therethrough than the main portion of the membrane, i.e. a highly permeable zone. Making the same assumptions as in Figures 1 and 2, the impermeable zone $i$ will be at the right hand end and the highly permeable zone $p$ at the left hand end. Then when the membrane M is moving upwards Figure 3, arrow $a$, the fraction above it is dammed up at the right hand end, arrows $e$, but can pass freely through at the left hand end, arrows $f$, so that above the membrane a pressure acts from right to left thus moving the fraction to the left, arrow $d$, while on the underside the fraction will be moved to the right, arrow $c$. On the down stroke these horizontal movements will be reversed, as indicated in Figure 4. Thus, the desired motions are obtained though the phase relationship here cannot be independently chosen. However, calculation shows that a reasonably efficient relationship is obtained. With this mode of producing the motion parallel to the membrane by the use of an impermeable boundary zone and a highly permeable boundary zone at opposite ends of the membrane, the membrane may for mechanical convenience be of circular form, one of the zones then being at the periphery and the other at the centre, and the motion of the media parallel to the membrane being radial. The peripheral and central zones are still in effect end zones, in that they lie at those zones of the membrane towards and away from which the motion of the media parallel to the membrane takes place.

Figure 5:
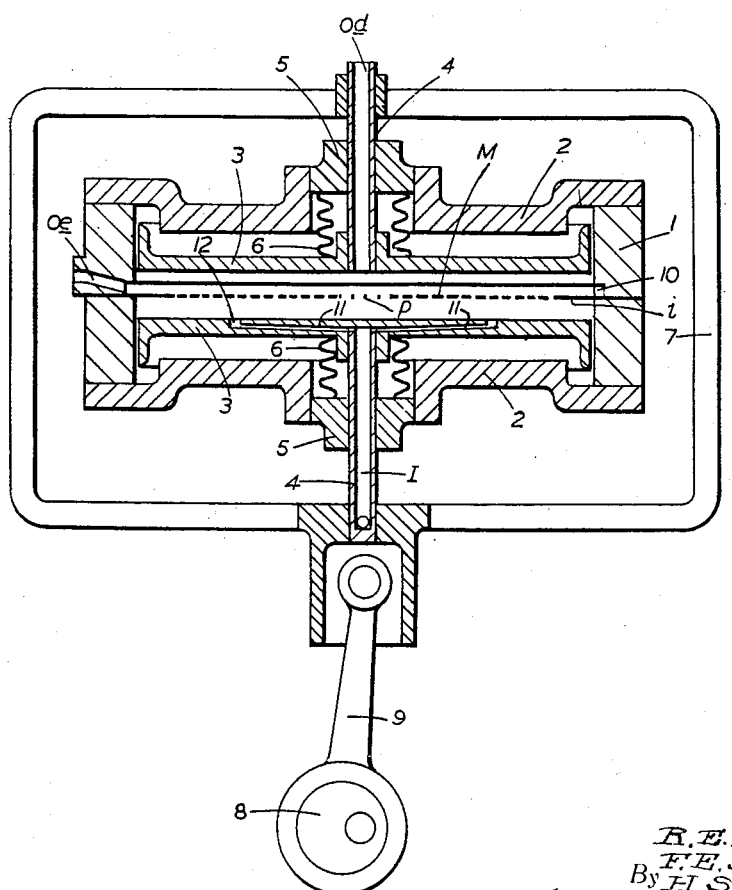
Figure 5 is a diagrammatic sectional elevation of a single circular membrane structure embodying the first form of the invention, the reciprocating motion being imparted mechanically and the periodic motion by the use of less permeable and more permeable membrane zones.

Figure 5 illustrates one arrangement of apparatus embodying a circular membrane M having a highly permeable zone $p$ at the centre and an impermeable zone $i$ at the periphery. The membrane is mounted midway of the length of a cylinder 1 closed at its ends by covers 2. Two pistons 3 work in the cylinder on opposite sides of the membrane, each being carried by a rod 4 guided in a bushing 5 on the cover 2 and making joint, for instance by a metallic bellows 6. The two rods are rigidly linked together by a yoke 7 and are actuated by means such as an eccentric 8 and eccentric rod 9. The eccentric may be rotated by any convenient means not shown.

One fraction is collected in a peripheral groove 10 and led out through the port $Oe$. The outlet $Od$ for the other fraction is provided in this example in the upper piston rod 4 which is made hollow for the purpose. The inlet I for the mixture to be treated is similarly a bore in the lower piston rod 4, communicating through ducts 11 with a groove 12 in the lower piston.

In the second form of the invention, that is to say in the form in which the reciprocating motion normal to the membrane is between one wall on the one hand and the membrane and the other wall on the other hand, the operation will not be so efficient as in the first, but the mechanical features are simplified. Moreover the membrane can be provided with longitudinal supports between itself and the fixed wall without interference with the flow conditions.

Figure 6:
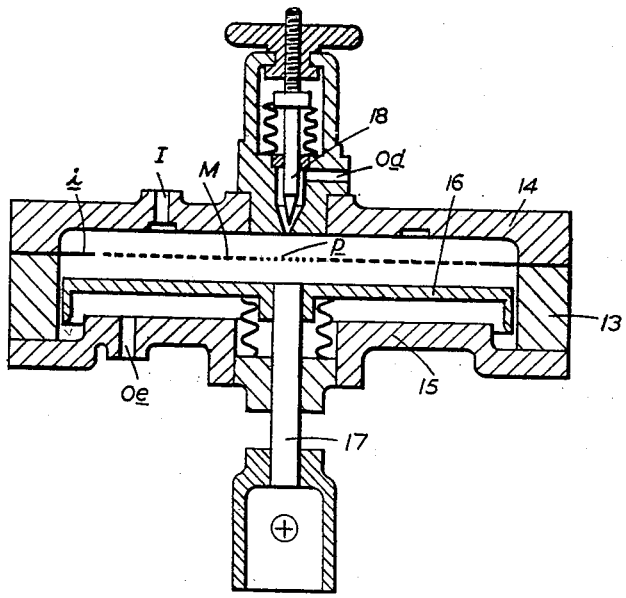
Figure 6 is a diagrammatic sectional elevation of a single circular membrane structure embodying the second form of the invention, the reciprocating and periodic motions being imparted similarly to Fig. 5.

Figure 6 illustrates one possible arrangement of apparatus embodying this form of the invention. As in Figure 5 this example also makes use of highly permeable and impermeable zones $p$, $i$, and has a circular membrane M. Also as in Figure 5 the membrane is held in a cylinder 13, with covers 14, 15, but only one piston 16 is provided which may be actuated by means such as an eccentric and eccentric rod (not shown), acting through a guided and sealed piston rod 17. In this example the mixture inlet I and the depleted fraction outlet $Od$ are provided in the top cover 14, the outlet $Od$ being shown provided with a throttle valve 18; the enriched fraction is led out through the clearance between piston and cylinder, which can be done wtihout unduly affecting the general flow and motion of the media, and the outlet $Oe$ is accordingly provided in the bottom cover 15. The mode of operation is sufficiently similar to that described above in connection with Figure 5 as not to require further detailed description.

It will be understood that a multiplicity of working spaces each comprising a membrane and associated walls may be assembled into a single machine, the several membranes acting in parallel or series or combinations of parallel and series, in particular in a grouping in which the number of membranes in parallel decreases in each succeeding group, and that countercurrent flow may be used, i.e. the fractions from any particular group may be led respectively forward and back to a succeeding and a preceding group.

Figure 7:
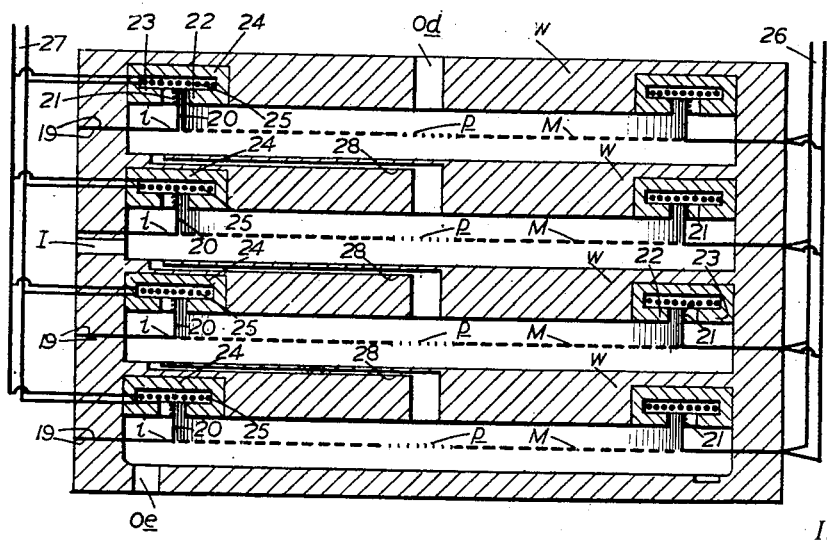
Fig. 7 is a diagrammatic sectional elevation of a multi-membrane structure in which the reciprocating motion is imparted electro-magnetically.

Figure 7 illustrates one form of machine having a multiplicity of working spaces and also shows how the reciprocation may be effected electromagnetically. In this case the walls $w$ are stationary and the membranes M are reciprocated. For this purpose the impermeable peripheral zone $i$ of each membrane is of rubber or similar resilient material, clamped at the margin and thereby sealed between shoulders 19 on the successive walls $w$.

A cylindrical wall 20, coaxial with the membrane is mounted on each membrane, its diameter being such that it projects from the membrane at the junction of the rubber zone $i$ with the main portion of the membrane. The wall 20 is of such length that the portion thereof remote from the membrane lies freely within an annular gap between annular pole pieces 22, 23 provided on a hollow annular member 24 of magnetic material of substantially Ω section which carries within its hollow a pancake-shaped winding 25 coaxial with the membrane. The wall 20 carries on the portion lying in the annular gap a helical winding 21. If now the windings 25 are excited, radial magnetic fields will be set up in each annular gap between each pair of pole pieces. At any point in each such field the turns of the winding 21 are at right angles to the field and accordingly if the windings 21 are excited they will so far as they are unconstrained move in a direction at right angles to themselves and to the radial fields, i.e. they will move axially taking the wall 20 and diaphragms with them so far as the zones $i$ will yield, the direction being upward or downward in Fig. 7, depending on the direction of the windings and currents. Accordingly, by exciting one set of windings with direct current and the other with alternating current the membranes can be caused to reciprocate in phase with one another and at the frequency of the alternating current. Leads for supplying the windings 21, 25 respectively are indicated at 26, 27. The walls $w$ and shoulders 19 should preferably be of non-magnetic material to avoid difficulties due to magnetic leakages.

In this example the several working spaces are in series, a duct 28 leading from the centre of each membrane below to the periphery of each membrane above. The final connections to the assembly are at O$e$, O$d$ while the mixture inlet will be at a suitable point on the concentration gradient through the whole machine. In the drawing the inlet I is shown midway along the gradient.

In the example of Fig. 8 which is on the same lines as Fig. 7 and in which as far as applicable the same references are used, the several working spaces are in parallel. To this end the common inlet pipe I has a branch 29 leading to an intermediate position with respect to each membrane, all the peripheral outlets O$e$ for the enriched fractions lead to a common pipe 30, and all the central outlets O$d$ for the depleted fractions lead to a common pipe 31.

In the example of Fig. 9 which is again on the same lines as Fig. 7 and in which as far as applicable the same references are used, the working spaces are in two groups of two, those within each group being in parallel and the two groups being connected in series. Thus the lower two working spaces form one group and the upper two the other group. A common inlet pipe 32 leads to an inlet I for each group, the outlet O$e$ for the enriched fraction from each group leads to a common pipe 33 at the outlet O$d$ for the depleted fraction from each group leads to a common pipe 34, while within each group the duct 28 leads from the centre of the membrane below to the periphery of the membrane above.

We claim:

1. A method of treating mixtures of gaseous or vaporous media by diffusion through a permeable membrane which divides the mixture under treatment into two portions restricted by boundary walls to the form of thin layers, which includes the steps of subjecting the layers to pressure variations such as to produce a pressure difference acting on the membrane in opposite directions alternately, simultaneously imparting to the said layers a periodic motion substantially parallel to the membrane in opposite directions on the two sides thereof and of the same frequency as said alternating pressure difference whereby a concentration gradient is set up in the layers in the direction of the periodic motion, supplying the mixture for treatment intermediate the extremes of said gradient, and taking off fractions in the regions of the extremes of said gradient.

2. A method of treating mixtures of gaseous or vaporous media by diffusion through a permeable membrane which divides the mixture under treatment into two portions restricted by boundary walls to the form of thin layers, which includes the steps of imparting relative reciprocating motion between said membrane and at least one of said walls facing said membrane in a direction substantially normal to said membrane, thereby subjecting said layers to a pressure difference acting on the membrane in opposite directions alternately, simultaneously imparting to the said layers a periodic motion substantially parallel to the membrane in opposite directions on the two sides thereof and of the same frequency as said alternating pressure difference whereby a concentration gradient is set up in the layers in the direction of the periodic motion, supplying the mixture for treatment intermediate the extremes of said gradient, and taking off fractions in the regions of the extremes of said gradient.

3. A method as set forth in claim 2 wherein said relative reciprocating motion takes place between the membrane on the one hand and the walls facing it on the other hand.

4. A method as set forth in claim 2 wherein said relative reciprocating motion takes place between one of the walls facing said membrane on the one hand and the membrane and the other of the walls facing said membrane on the other hand.

5. A method of treating mixtures of gaseous or vaporous media by diffusion through a permeable membrane the permeability of which is graduated from a boundary zone of high permeability in effect at one end to another boundary zone of low permeability in effect at the other end, which membrane divides the mixture under treatment into two portions restricted by boundary walls to the form of thin layers, which includes the steps of subjecting the layers to pressure variations such as to produce a pressure difference acting on the membrane in opposite directions alternately, whereby the mixture is diffused through the membrane in opposite directions alternately and by the action of said boundary zones is simultaneously given a periodic motion of the same frequency as said alternating pressure difference, in a direction substantially parallel to the membrane but in opposite directions on the opposite sides thereof, resulting in a concentration gradient in the layers in the direction of the periodic motion, supplying the mixture for treatment intermediate the extremes of said gradient, and taking off fractions in the regions of the extremes of said gradient.

6. A method of treating mixtures of gaseous or vaporous media by diffusion through a permeable membrane having a boundary zone at one end thereof of substantially greater permeability than the main portion thereof and another boundary zone at the other end thereof of substantially less permeability than the main portion thereof, which membrane divides the mixture under treatment into two portions restricted by boundary walls to the form of thin layers, which includes the steps of subjecting the layers to pressure variations such as to produce a pressure difference acting on the membrane in opposite directions alternately, whereby the mixture is diffused through the membrane in opposite directions alternately and by the action of said boundary zones is simultaneously given a periodic motion of the same frequency as said alternating pressure difference, in a direction substantially parallel to the membrane but in opposite directions on the opposite sides thereof, resulting in a concentration gradient in the layers in the direction of the periodic motion, supplying the mixture for treatment intermediate the extremes of said gradient, and taking off fractions in the regions of the extremes of said gradient.

7. A method of treating mixtures of gaseous or vaporous media by diffusion through a permeable membrane having a boundary zone at one end thereof of substantially greater permeability than the main portion thereof and another boundary zone at the other end thereof of substantially less permeability than the main portion thereof, which membrane divides the mixture under treatment into two portions restricted by boundary walls to the form of thin layers, which includes the steps of imparting relative reciprocating motion between said membrane and at least one of said walls facing said membrane in a direction substantially normal to said membrane, whereby the mixture is caused to diffuse through the membrane in opposite directions alternately and by the action of said boundary zones is simultaneously given a periodic motion of the same frequency as said alternating pressure difference, in a direction substantially parallel to the membrane but in opposite directions on the opposite sides thereof, resulting in a concentration gradient in the layers in the direction of the periodic motion, supplying the mixture for treatment intermediate the extremes of said gradient, and taking off fractions in the regions of the extremes of said gradient.

8. A method as set forth in claim 7 wherein said relative reciprocating motion takes place between the membrane on the one hand and the walls facing it on the other hand.

9. A method as set forth in claim 7 wherein said relative reciprocating motion takes place between one of the walls facing said membrane on the one hand and the membrane and the other of the walls facing said membrane on the other hand.

10. Apparatus for the treatment of mixtures of gaseous or vaporous media by diffusion, comprising a permeable membrane, boundary walls enclosing a shallow compartment on each side of said membrane for the reception of the mixture to be treated, means for producing variations of pressure of the mixture in the respective compartments such as to produce a pressure difference acting on said membrane in opposite directions alternately, means for imparting to the mixture in the compartments a periodic motion substantially parallel to said membrane in a direction from one end of the membrane to the other, said periodic motion being in opposite directions on the two sides of the membrane and of the same frequency as said alternating pressure difference, means for supplying the mixture for treatment to at least one of said compartments at a point intermediate of the said ends, and means for taking a fraction out of at least one of said compartments in the neighbourhood of one of said ends, and means for taking a fraction out of at least one of said compartments in the neighbourhood of the other of said ends.

11. Apparatus for the treatment of mixtures of gaseous or vaporous media by diffusion, comprising a permeable membrane, boundary walls enclosing a shallow compartment on each side of said membrane for reception of the mixture to be treated, means for producing relative reciprocation in a direction substantially normal to said membrane between said membrane and at least one of said walls facing said membrane, means for imparting to the mixture in said compartments a periodic motion substantially parallel to said membrane in a direction from one end of the membrane to the other, said periodic motion being in opposite directions on the two sides of the membrane and of the same frequency as said reciprocation, means for supplying the mixture for treatment to at least one of said compartments at a point intermediate of said ends, means for taking a fraction out of at least one of said compartments in the neighbourhood of one of said ends and means for taking a fraction out of at least one of said compartments in the neighbourhood of the other of said ends.

12. Apparatus for the treatment of mixtures of gaseous or vaporous media by diffusion, comprising a permeable membrane having at its ends boundary zones respectively presenting less and more resistance to flow therethrough of the media than the main part of said membrane, boundary walls enclosing a shallow compartment on each side of said membrane for reception of the mixture to be treated, means for producing variations of pressure of the mixture in the compartments such as to produce a pressure difference acting on said membrane and boundary zones in opposite directions alternately, means for supplying the mixture for treatment to at least one of said compartments at a point intermediate of said boundary zones, means for taking a fraction out of at least one of said compartments in the neighbourhood of one of said zones, and means for taking a fraction out of at least one of said compartments in the neighbourhood of the other of said zones.

13. Apparatus for the treatment of mixtures of gaseous or vaporous media by diffusion, comprising a permeable membrane having at its ends boundary zones respectively presenting less and more resistance to flow therethrough of the media than the main part of said membrane, boundary walls enclosing a shallow compartment on each side of said membrane for reception of the mixture to be treated, means for producing relative reciprocation in a direction substantially normal to said membrane between said membrane and at least one of said walls facing said membrane, means for supplying the mixture for treatment to at least one of said compartments at a point intermediate of said boundary zones, means for taking a fraction out of at least one of said compartments in the neighbourhood of one of said zones, and means for taking a fraction out of at least one of said compartments in the neighbourhood of the other of said zones.

14. Apparatus for the treatment of mixtures of gaseous or vaporous media by diffusion, comprising a permeable membrane the central and peripheral zones of which differ in permeability from that of the intermediate portion of the membrane, one zone being of substantially greater permeability and the other of substantially less permeability, boundary walls enclosing a shallow compartment on each side of said membrane for reception of the mixture to be treated, means for producing variations of pressure of the mixture in the compartments such as to produce a pressure difference acting on said membrane in opposite directions alternately, means for supplying mixture for treatment to at least one of said compartments at a region between the centre and periphery thereof, means for taking a fraction out of at least one of said compartments in the central region thereof, and means for taking a fraction out of at least one of said compartments in the peripheral region thereof.

15. Apparatus for the treatment of mixtures of gaseous or vaporous media by diffusion, comprising a permeable membrane the central and peripheral zones of which differ in permeability from that of the intermediate portion of the membrane, one zone being of substantially greater permeability and the other of substantially less permeability, boundary walls enclosing a shallow compartment on each side of said membrane for reception of the mixture to be treated, means for producing relative reciprocation in a direction substantially normal to said membrane between said membrane and at least one of said walls facing said membrane, means for supplying mixture for treatment to at least one of said compartments at a region between the centre and periphery thereof, means for taking a fraction out of at least one of said compartments in the central region thereof, and means for taking a fraction out of at least one of said compartments in the peripheral region thereof.

16. Apparatus for the treatment of mixtures of gaseous or vaporous media by diffusion, comprising a permeable membrane the central and peripheral zones of which differ in permeability from that of the intermediate portion of the membrane, one zone being of substantially greater permeability and the other of substantially less permeability, boundary walls enclosing a shallow compartment on each side of said membrane for reception of the mixture to be treated, means for producing relative reciprocation in a direction substantially normal to said membrane between said membrane on the one hand and said walls on the other hand, means for supplying mixture for treatment to at least one of said compartments at a region between the centre and periphery thereof, means for taking a fraction out of at least one of said compartments in the central region thereof, and means for taking a fraction out of at least one of said compartments in the peripheral region thereof.

17. Apparatus for the treatment of mixtures of gaseous or vaporous media by diffusion, comprising a permeable membrane the central and peripheral zones of which differ in permeability from that of the intermediate portion of the membrane, one zone being of substantially greater permeability and the other of substantially less permeability, boundary walls enclosing a shallow compartment on each side of said membrane for reception of the mixture to be treated, means for producing relative reciprocation in a direction substantially normal to said membrane between one of said walls facing said membrane on one side thereof on the one hand and the membrane and the wall facing said membrane on the other side thereof on the other hand, means for supplying mixture for treatment to at least one of said compartments at a region between the centre and periphery thereof, means for taking a fraction out of at least one of said compartments in the central region thereof, and means for taking a fraction out of at least one of said compartments in the peripheral region thereof.

References Cited in the file of this patent

UNITED STATES PATENTS

| 307,041 | Herzog | Oct. 21, 1884 |
| 820,283 | Clamond | May 8, 1906 |
| 2,255,069 | Maier | Sept. 9, 1941 |

FOREIGN PATENTS

| 266,396 | Great Britain | Feb. 23, 1927 |
| 258,336 | Italy | Apr. 15, 1927 |